United States Patent
Field et al.

[15] 3,684,776
[45] Aug. 15, 1972

[54] NOVEL INTERPOLYMERS USEFUL AS THICKENING AGENTS

[72] Inventors: Nathan D. Field, 2736 Liberty St., Allentown, Pa. 18104; Earl P. Williams, 803 Applegate Ave., Pen Argyl, Pa. 18072

[22] Filed: March 20, 1970

[21] Appl. No.: 21,476

[52] U.S. Cl. ............260/78.5 T, 71/1, 167/87, 167/87.1, 167/91, 260/29.1 R, 260/29.2 R, 260/29.6 RB, 260/30.2, 260/30.6 R, 260/32.6 N, 260/33.4 PQ, 260/78 UA
[51] Int. Cl. ...................................................C08f 27/12
[58] Field of Search .................................260/78.5 T

[56] References Cited

UNITED STATES PATENTS

| | | | |
|---|---|---|---|
| 2,985,625 | 5/1961 | Jones | 260/78 |
| 2,866,772 | 12/1958 | Sellers | 260/45.7 |
| 3,398,092 | 8/1968 | Field et al. | 210/24 |
| 2,977,334 | 3/1961 | Zopf et al. | 260/27 |
| 2,698,316 | 12/1954 | Giammaria | 260/78 |
| 3,506,625 | 4/1970 | Patinkin et al. | 260/78.5 |
| 3,499,876 | 3/1970 | Field et al. | 260/78.5 |

Primary Examiner—Joseph L. Schofer
Assistant Examiner—John Kight, III
Attorney—Samson B. Leavitt, Walter C. Kehm and Alvin H. Fritschler

[57] ABSTRACT

Interpolymers consisting essentially of the structural units in anhydride form:

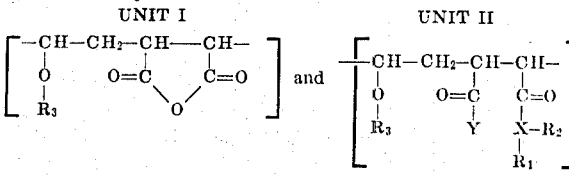

wherein
X represents

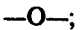

—O—;

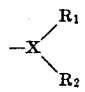

Y represents —OH, —OR$_1$,
and when Y and R$_2$ are taken together represent a single bond of an imide ring; R$_1$ and R$_2$ represent hydrogen or the same or different hydrocarbon radicals having from one to 50 carbon atoms and together contain a total of from six to 50 carbon atoms selected from the group consisting of normal chain alkyl, branched chain alkyl, cycloalkyl, and alkylaryl radicals;
(where X = —O—, R$_2$ does not exist); R$_3$ represents the same or different hydrocarbon radicals selected from the group consisting of methyl, ethyl, propyl, isopropyl, butyl, isobutyl, and (—CH$_2$CH$_2$O)$_q$(CH$_2$)$_m$ CH$_3$ radicals wherein $q$ represents an integer of from about 1 to about 3 and $m$ represents an integer of from about 0 to about 3.

5 Claims, No Drawings

NOVEL INTERPOLYMERS USEFUL AS THICKENING AGENTS

The instant invention is directed to novel interpolymer compositions. In particular, the instant invention is directed to novel interpolymer compositions which are useful as thickening agent.

We have now discovered a new class of highly useful interpolymers that are derivatives of maleic anhydride and a vinyl ether monomer or mixtures of vinyl ether monomers which may be used as thickening agents.

The instant compounds have been found to be very useful in thickening solutions of high ionic strength, including concentrated salt solutions as well as bases and acids where most conventional water-soluble polymers have little effect or are insoluble. For example, the instant interpolymers are very effective in thickening 15 percent diammonium phosphate solution, which is used in fire-fighting and 20 percent tetrapotassium pyrophosphate which is used in detergent compositions and 5 percent sodium bromate which is used in permanent wave formulations. Moreover, the instant interpolymers are very effective for thickening concentrated ammonia as well as for thickening other strong alkali solutions such as sodium hydroxide, sodium carbonate, trisodium phosphate and sodium silicate. The thickened ammonia solutions are useful as agricultural fertilizers and the thickened strongly alkaline solutions are useful as heavy duty cleaners, pain removers, oven cleaners, etc. Moreover, the instant compounds may be used to thicken water and rubber latices as well as nonaqueous solutions or mixtures of non-aqueous and aqueous solutions such as glycerine, ethylene glycol, alcohols, methyl ethyl ketone, acetone, dimethyl formamide, dioxane as well as water solutions of the above. The instant compounds are also useful as gelling agents in cosmetic formulations such as shampoos, hand lotions, shaving creams, etc. The above solutions and dispersions have good stability upon storage, in fact some of them have even exhibited increased viscosity values upon storage.

The vinyl monomers which may be employed in connection with the instant invention may be represented by the structural formula:

$$R_3 - O - CH = CH_2$$

wherein $R_3$ represents the same or different hydrocarbon radicals selected from the group consisting of methyl, ethyl, propyl, isopropyl, butyl, isobutyl and $(CH_2CH_2O)_q (CH_2)_m CH_3$ radicals wherein $q$ represents an integer from about 1 to about 3 and $m$ represents an integer of from about 0 to about 3.

More specifically, the novel interpolymers of the instant invention are those which have the following structural units:

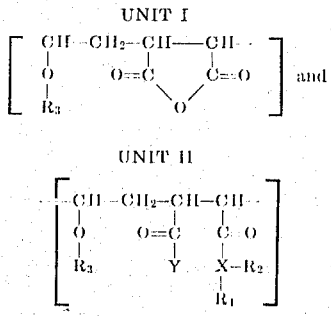

wherein
X represents 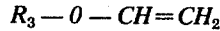

Y represents —OH, —OR$_1$, —X$\begin{matrix} R_1 \\ R_2 \end{matrix}$.

and when Y and $R_2$ are taken together represent a single bond of an imide ring; $R_1$ and $R_2$ represent hydrogen or the same or different hydrocarbon radicals having from 1 – 50 carbon atoms and together contain a total of from 6 to 50 carbon atoms selected from the group consisting of normal chain alkyl, branched chain alkyl, cycloalkyl, and alkylaryl radicals (where X=—O—, $R_2$ does not exist); $R_3$ represents the same or different hydrocarbon radicals selected from the group consisting of methyl, ethyl, propyl, isopropyl, butyl, isobutyl, and $(CH_2CH_2O)_q(CH_2)_mCH_3$ radicals wherein $q$ represents an integer of from about 1 to about 3 $m$ represents an integer of from about 0 to about 3.

Wherein structural Unit I represents about 75 to 99.5 mole percent and structural Unit II represents about 25 to 0.5 mole percent of the interpolymer preferably about 85 to 99 mole percent in Unit I and about 1 to 15 mole percent in Unit II.

The molecular weight of the novel interpolymers of this invention may be conveniently defined by way of the specific viscosity of the precursor copolymer. That is to say, the molecular weight may be defined by the specific viscosity of Units I and II wherein both units are totally anhydride units prior to amidation or esterification of Unit II. In such instances one gram of the copolymer per 100 milliliters of methyl ethyl ketone solution should have a specific viscosity of 25° C in the range of from about 0.1 to about 25.0. Preferably, the novel interpolymers of the instant invention have a specific viscosity at 25° C in methyl ethyl ketone solution of from about 0.2 to about 20.

The partial ester, amide or imide interpolymers of the instant invention may be prepared in two steps via conventional known methods. For example, the precursor anhydride copolymers are well known in the art and may be prepared by interpolymerizing maleic anhydride and a vinyl ether monomer or mixtures of vinyl ether monomers using approximately one mole of maleic anhydride per mole of vinyl ether monomer. A small molar excess of the vinyl ether monomer (5 to 10 percent) above that of the maleic anhydride may be advantageous for insuring complete conversion of the maleic anhydride. The polymerization is carried out conveniently by preparing a solvent solution of the monomers with a catalytic amount (preferably from 0.01 to 1.0 percent) of an organic free-radical-generating initiator. The resulting solution is mixed thoroughly and heated sufficiently so that polymerization reaction takes place. The amount of solvent is not critical and such solvents as benzene, toluene, xylene, acetone, methyl ethyl ketone, and methylene chloride, and the like may be used. However, benzene is considered the most suitable from the standpoint of product isolation and obtaining high molecular weights. The resultant anhydride copolymer slurry may then be employed as is or diluted with additional or different solvents or isolated by any suitable means, such as filtration and reslurried or dissolved in a more suitable solvent for the subsequent esterification or amidation or imidation reaction.

Among the organic free-radical-generating initiators that may be mentioned are azobisisobutyronitrile, benzoyl peroxide, lauroyl peroxide, caprylyl peroxide, acetyl peroxide, acetyl benzoyl peroxide, di-tert-butyl peroxide or dimethyl azoisobutyrate and the like. Mixtures of such catalysts are also suitable in the process of making the interpolymers of the invention. Radiation polymerization can be used, too, e.g., such high energy radiation sources as ultra violet light, X-rays, $\gamma$-rays, neutrons and the like can be used to initiate polymerization.

The polymerization may be carried out at a temperature within the range of 0° to 150°, preferred temperatures lie for the most part in the range from 40° to 100° C., particularly about 60°–80° C.

Among the vinyl ether monomers represented by $R_3OCH\ CH_2$ suitable for use are methyl vinyl ether, ethyl vinyl ether, propyl vinyl ether, isopropyl vinyl ether, butyl vinyl ether, isobutyl vinyl ether, methoxyethyl vinyl ether, methoxyethoxyethyl vinyl ether, and the monomethyl ether of triethylene glycol vinyl ether or mixtures thereof.

The second step of the preparation of the novel interpolymers of the instant invention is the reaction of the resultant copolymer of the process set forth above so as to form the partial amide or partial ester or partial imide thereof. The partial amide may be prepared by reaction of said copolymer with a monoamino primary or secondary amine containing from about six to about 50 carbon atoms in molar amounts of from about 0.5 to about 25 percent of the total anhydride content. Conditions for the formation of the subject amides are well known in the art and include the reaction of the above-noted amines with the anhydride copolymer in a suitable solvent therefor for a suitable period of time. Amines which may be employed to prepare the partial amides of the instant invention may be exemplified by the following:

hexyl amine
heptyl amine
octyl amine
nonyl amine
decyl amine
hendecyl amine
dodecyl amine
tetradecyl amine
hexadecyl amine
octadecyl amine
oleylamine
stearyl amine
octadecadienylamine
2-aminooctane
tertiary nonylamine
coconut fatty amine
soya fatty amine
tallow fatty amine
hydrogenated tallow fatty amine
tall oil amine
rosin amine
cyclohexylamine
benzylamine
di-n-propylamine
di-iso-propylamine
dibutylamine
diamylamine
didodecylamine
dioctadecylamine
tridecylamine
2-ethylhexyl amine
di(2-ethylhexyl)amine
N-methyl dodecylamine
N-ethyl tetradecylamine
iso-decyl amine and mixtures of such amines in any proportions.

The partial ester interpolymers of the instant invention may be prepared by reaction of the above-discussed anhydride copolymers with a monohydric hydrophobic alcohol containing from about six to about 36 carbon atoms in molar amounts of from about 0.5 to 25 percent of the total anhydride content. The conditions for such formation are all well known in the art and, therefore, not set forth herein in detail. Exemplary of the alcohols which may be employed in connection with the instant invention are the following:

n-hexanol
n-heptanol
n-octanol
n-nonanol
n-decanol
n-dodecanol
n-tetradecanol
n-hexadecanol
n-octadecanol
oleyl alcohol
branched chained alcohols such as sec octanol
pentamethyloctanol
tetramethylnonanol
diethyloctanol.

Furthermore, alcohols prepared by the catalytic reaction of an olefin such as tripropylene, tetrapropylene, pentapropylene, and the like with carbon monoxide and hydrogen to form an aldehyde followed by the catalytic reduction of said aldehyde to an alcohol may also be employed. The above process for the production of such alcohols is known as the oxo process. Furthermore, alcohols such as cyclohexanol, α-terpineol, cholesterol, benzyl alcohol, β-phenylethyl alcohol, cinnamyl alcohol, citronellol and the like, as well as mixtures of any of the above such as "Lorol 5" which is a mixture of $C_{10}$ to $C_{18}$ alcohols.

The partial imides of the subject invention may be prepared by converting all or part of the partial amides formed according to the above to imide under conditions as are set forth in U. S. Pat. No. 2,313,565 which is hereby incorporated by reference. That is to say, that the above formed amide may be reacted in a methylated naphthalene for a period of from 0.5 to 5 hours at temperatures of from about 150° to 250° so as to convert the amide to the imide form. The resultant product is then cooled, filtered and washed with a suitable solvent and filtered and dried.

The anhydride interpolymers of this invention may be converted by hydrolysis, neutralization, esterification and the like to compounds having the following structural units:

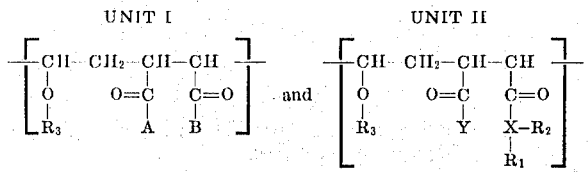

wherein X, Y, $R_1$, $R_2$, and $R_3$ and the mole percentages of Unit I and Unit II have the same meaning as described, and wherein A and B each independently represent a member selected from the group consisting of —OH, —OM, —$NH_2$

alkoxy, and aryloxy, where $Z_1$ and $Z_2$ are selected from the group consisting of hydrogen, alkyl, aryl or together form a ring, and wherein M represents a salt forming cation selected from the group consisting of alkali metals, ammonium and substituted ammonium, such as K, Na, $NH_4$, methylammonium, diethanolammonium, piperidinium, morpholinium, triethanolammonium and the like.

The above water-soluble interpolymers include those ammoniated products involving partial as well as complete conversion of the anhydride moiety such as those compounds containing the ammonium salt-half amide moiety which may be depicted as:

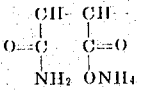

These water-soluble interpolymers may be easily derived from the above-described interpolymers by forming derivatives of the anhydride portion of the polymer, by known hydrolyzing reaction thereof with water, and/or reactions involving primary and secondary alcohols, primary and secondary amines or alkali basic media to form salts, partial ester-salts, or partial amide-salts and the like.

Among the more preferred reactants that may be mentioned are water, ammonia, alkali solutions, such as sodium hydroxide, potassium hydroxide or ammonium hydroxide, etc.; methylamine, piperidine, morpholine, diethanolamine, triethanolamine, etc.; alcohols, such as methanol, ethanol, propanol, and the like; phenols, naphthols, etc.

As noted, an object of the instant invention is to provide novel interpolymers which are particularly useful in thickened aqueous systems, i.e., in a composition of matter comprising an aqueous system having therein a thickening amount of the novel interpolymers of the instant invention.

Such systems include, for example, water itself, aqueous-alkaline mixtures, aqueous-alcohol mixtures, aqueous-acid systems, aqueous ionic salt mixtures, polymer latices, and the like. Examples of the aqueous ionic salt, acid or alkali systems which can be thickened in accordance with present invention include solutions of diammonium phosphate, tetrapotassium pyrophosphate, ammonium hydroxide, tetrapotassium pyrophosphate, ammonium hydroxide, sodium hydroxide, sodium bromate, hydrochloric acid, and the like.

The amount of water present in the above-mentioned aqueous systems is in no way critical, as the thickeners employed can be utilized to thicken compositions wherein water is present in only a minor amount up to an aqueous system where water is the major component. The amount of water present in the aqueous system, therefor, is merely dependent on the use for which the thickened system is intended. In general, however, it is preferred to utilize aqueous solutions containing 1 to 60 percent ionic material.

Furthermore, the amount of thickener to be employed in the aqueous compositions will vary according to the desired result, the system employed, and as a practical matter, the general economic considerations. In general, however, a range of from about 0.1 to about 15 percent by weight of the total aqueous composition is employed, although greater or lesser amounts can be advantageously employed when desired.

The use of the instant thickeners in the above aqueous systems is indeed unique. For example, in many ionic solutions using standard thickeners the viscosity decreases as the ionic content increases. Hence, it was unexpected that the viscosity increased with ionic content when using the novel subject thickeners.

The following examples are illustrative of the present invention and are not to be regarded as limitative. It is to be understood that all parts, percentages and proportions referred to herein and in the appended claims are by weight unless otherwise indicated. The viscosities listed in the following examples were obtained with a Brookfield rotation viscometer and the value expressed in centipoises. The designation "PVM/MA" as used in this example and in the following examples, is the commonly abbreviated form for methyl vinyl ether-maleic anhydride copolymer.

EXAMPLE 1

The following solution was prepared:

31.2 grams (0.2 moles of PVM/MA, specific viscosity 1 percent in methyl ethyl ketone at 25° C = 3.47) was dissolved in 1,000 ml. C. P. methyl ethyl ketone in a 2-liter reaction flask equipped with stirrer, reflux condenser and thermometer. To this was added 2.4 g (0.008 mole) hydrogenated tallow fatty amine (a mixture of 25 percent hexadecyl amine, 70 percent octadecyl amine, and 5 percent octadecenyl amine) dissolved in 40 ml. of C. P. methyl ethyl ketone.

The solution was then stirred for 19 hours at from about 25° to 28° C and then poured into 3,300 ml. of n-heptane filtered and then dried in a vacuum oven at 25° C. The dried product 4 mole percent hydrogenated tallow amide of PVM/MA weighed 33.0 grams.

EXAMPLE 2

7.8 grams (0.05 moles) of the PVM/MA used in Example 1 was dissolved in 200 mls. of C. P. methyl ethyl ketone in a 500 ml. reaction flask equipped with stirrer, reflux condensor and thermometer. To this was added 1.0 g of cetyl alcohol (0.004 moles) dissolved in 10 ml of C. P. methyl ethyl ketone. The mixture was then heated to reflux at 77° C and held to this temperature for approximately 16 hours. The solution was then cooled to 25° C and poured into 1,200 ml. n-heptane, filtered, and dried in a vacuum oven at 25°C. The dried powder of 8.0 mole percent cetyl ester of PVM/MA weight 8.0 grams.

EXAMPLE 3

5.0 grams of the product of Example 1 were heated to between 170° and 189° C in a 150 ml. of methylated naphthalene (Velsicol AR–55) for 1 hour. The mixture was then cooled, filtered and washed in 250 mls. of n-heptane filtered and dried. The dried brown powder of 4 mole percent hydrogenated tallow imide of PVM/MA weighed 4.0 grams. Infra-red analysis showed imide but no amide bands present.

EXAMPLE 4

The thickening properties of the subject polyamide interpolymers were demonstrated as follows. A solution of:

| | |
|---|---|
| Interpolymer Example 1 | 1.00 g. |
| Diammonium phosphate | 15.0 g. |
| Distilled water | 84.0 g. | was prepared. The mixture was rotated on a vertically mounted slowly revolving (3.5 rpm) 30 inch diameter wheel for a period of 18 hours at 25° C. The polymer solution exhibited a Brookfield viscosity of 3,200 CPS at 25° C using a No. 7 spindle and 10 rpm.

EXAMPLE 5

A 2 percent interpolymer solution was prepared to demonstrate the thickening qualities of the subject interpolymers. A solution of:

| | |
|---|---|
| Interpolymer Example 1 | 2.0 g. |
| Diammonium phosphate | 15.0 g. |
| Distilled water | 83.0 g. | was prepared. The mixture was rotated on a vertically mounted slowly revolving (3.5 rpm) 30 inch diameter wheel for a period of 18 hours at 25° C. The polymer solution exhibited a Brookfield viscosity of 64,000 CPS at 25° C using a No. 7 spindle and 10 rpm.

EXAMPLE 6

So as to compare the effects of the novel interpolymers of the instant invention with PVM/MA alone the following solution was prepared:

| | |
|---|---|
| PVM/MA of Example 1 | 1.0 g. |
| Diammonium phosphate | 15.0 g. |
| Distilled water | 84.0 g. | was prepared. The mixture was treated as in Example 4 and found to have a Brookfield viscosity of 52 CPS at 25° C using a No. 3 spindle and 10 rpm. This comparison clearly evidences the novel and unexpected results obtained by the subject interpolymers of the instant invention.

EXAMPLE 7

As a comparison to Example 5, a 2 percent polymer solution of PVM/MA was prepared.

| | |
|---|---|
| PVM/MA of Example 1 | 2.0 g. |
| Diammonium phosphate | 15.0 g. |
| Distilled water | 83.0 g. |

The mixture was treated as in Example 5 and found to have a Brookfield viscosity of 170 CPS using a No. 3 spindle and 10 rpm's at a temperature of 25° C.

EXAMPLE 8

Four grams of an interpolymer prepared according to Example 2, comprising 1 mole of PVM/MA as in Example 1 reacted with 0.08 moles of cetyl alcohol were mixed with 15.0 grams of diammonium phosphate and 81.0 grams of distilled water. The mixture was rotated as in Example 4 and found to have a Brookfield viscosity of 32,400 CPS at 25° C using a No. 7 spindle and 10 rpm.

For comparative purposes, 4 grams of the PVM/MA copolymer used in Example 1 was mixed with 15.0 grams of diammonium phosphate and 81.0 grams of distilled water. The mixture was rotated as in Example 4 and found to have a Brookfield viscosity of 800 CPS at 25° C using a No. 7 spindle and 10 rpm.

EXAMPLE 9

One gram of an interpolymer prepared according to Example 1 were mixed with 47.0 grams of distilled water, 52.0 grams of 28.9 percent ammonia solution. The mixture was rotated as in Example 4 and found to have a Brookfield viscosity of 46,400 CPS at 25° C using a No. 7 spindle at 10 rpm.

The above procedure was repeated employing PVM/MA in lieu of the interpolymer of the instant invention. The resultant solution was found to have a Brookfield viscosity of 450 CPS at 25° C using a No. 6 spindle and 10 rpm.

EXAMPLE 10

Two grams of an interpolymer comprising isobutylvinyl ether and maleic anhydride copolymer (specific viscosity 1 percent methyl ethyl ketone 2.7 at 25° C) reacted with hydrogenated tallow fatty amine, were prepared as in Example 1. The interpolymer was mixed with 46.0 grams of distilled water and 52.0 grams of 28.9 percent ammonia solution. The mixture was treated as in Example 4 and found to have a Brookfield viscosity of 142,000 CPS at 25° C using a No. 7 spindle and 10 rpm. the exception that the unmodified copolymer of isobutylvinyl ether and maleic anhydride was substituted for the novel interpolymer of the instant invention. The resultant mixture was found to have a Brookfield viscosity of 608 CPS at 25° C using a No. 5 spindle and 10 rpm.

EXAMPLE 11

A mixture was prepared using 1 gram of the interpolymer of Example 1 in combination with 79.0 grams distilled water and 5.0 grams of tetrapotassium pyrophosphate. The mixture was treated as in Example 4 and found to have a Brookfield viscosity of 5,600 CPS at 25° C using a No. 7 spindle and 10 rpm.

For purposes of comparison, the above mixture was prepared employing a copolymer of PVM/MA as in Example 1 in lieu of the novel interpolymer of the instant invention. The resultant mixture was found to have a Brookfield viscosity of 35 CPS at 25° C using a No. 3 spindle and 10 rpm.

EXAMPLE 12

One gram of the interpolymer of Example 1 was mixed with 5.0 grams of sodium bromate, 92.3 grams distilled water and 1.7 grams 15 percent (w/w) sodium hydroxide solution. The mixture was treated as in Example 4 for a period of 65 hours. The mixture was found to have a Brookfield viscosity of 3,840 CPS at 25° C using a No. 7 spindle and 10 rpm. For purposes of comparison, the above composition was prepared using the unmodified copolymer of PVM/MA of Example 1 in lieu of the novel interpolymer of the instant invention. The resultant mixture was found to have a Brookfield viscosity of 20 CPS at 25° C using a No. 3 and 10 rpm.

EXAMPLE 13

One gram of the interpolymer of Example 1 was mixed with 46.5 grams of distilled water, 1.4 grams 15 percent (w/w) sodium hydroxide solution. 2.5 grams of sodium chloride was then added to the mixture and said mixture was treated as in Example 4. The mixture was found to have a Brookfield viscosity of 2,000 CPS at 25° C using a No. 6 spindle and 10 rpm.

For purposes of comparison, the above mixture was again prepared employing the unmodified PVM/MA copolymer of Example 1 in lieu of the novel interpolymer of the instant invention. The mixture was found to have a Brookfield viscosity of 95 CPS at 25° C using a No. 3 spindle and 10 rpm.

EXAMPLE 14

One gram of the novel interpolymer of Example 1 was mixed with 46.5 grams of distilled water, 1.4 grams 15 percent (w/w) sodium hydroxide solution and 2.5 grams of sodium sulfate was prepared as in Example 13. The resultant mixture was found to have a Brookfield viscosity of 6,400 CPS at 25° C using a No. 7 spindle and 10 rpm.

For purposes of comparison, the above mixture was prepared employing the unmodified PVM/MA copolymer of Example 1 in lieu of the novel interpolymer of the instant invention. The resultant mixture was found to have a Brookfield viscosity of 70 CPS at 25° C using a No. 3 spindle and 10 rpm.

EXAMPLE 15

One gram of the novel interpolymer of Example 1 was mixed with 46.5 grams of distilled water, 1.4 grams 15 percent (w/w) sodium hydroxide solution and 2.5 grams of sodium meta silicate. The mixture was prepared as in Example 10 and found to have a Brookfield viscosity of 3,020 CPS at 25° C using a No. 6 spindle and 10 rpm.

For purposes of comparison the above mixture was prepared substituting the unmodified PVM/MA copolymer of Example 1 for the novel interpolymer of the instant invention. The resultant mixture was found to have a Brookfield viscosity of 98 CPS using a No. 3 spindle and 10 rpm.

EXAMPLE 16

One gram of the novel interpolymer of Example 1 was mixed with 46.5 grams of distilled water, 1.4 grams of 15 percent (w/w) sodium hydroxide and 2.5 grams of sodium carbonate according to the method of Example 10. The mixture was found to have a Brookfield viscosity of 2,520 CPS at 25° C using a No. 6 spindle and 10 rpm.

For purposes of comparison, the above composition was again prepared employing the unmodified PVM/MA copolymer of Example 1 in lieu of the novel interpolymer of the instant invention. The resultant mixture was found to have a Brookfield viscosity of 110 CPS at 25° C using a No. 3 spindle and 10 rpm.

EXAMPLE 17

One gram of the novel interpolymer of Example 1 was mixed with 46.5 grams of distilled water, 1.4 grams of 15 percent (w/w) sodium hydroxide solution and 2.5 grams of sodium acetate which was prepared according to the method of Example 13. The mixture was found to have a Brookfield viscosity of 5,600 CPS at 25° C using a No. 7 spindle and 10 rpm.

For purposes of comparison, the above composition was again prepared employing the unmodified PVM/MA copolymer of Example 1 in lieu of the novel interpolymer of the instant invention. The resultant mixture was found to have a Brookfield viscosity of 100 CPS at 25° C using a No. 3 spindle and 10 rpm.

EXAMPLE 18

One gram of the novel interpolymer of Example 1 was mixed with 41.8 grams of distilled water, 1.4 grams 15 percent (w/w) sodium hydroxide solution, 5.8 grams of sodium phosphate $.12H_2O$ were prepared according to Example 13. The mixture was found to have a Brookfield viscosity of 1,400 CPS at 25° C using a No. 6 spindle and 10 rpm.

For purposes of comparison, the above mixture was again prepared employing the unmodified PVM/MA copolymer of Example 1 in lieu of the novel interpolymer of the instant invention. The resultant mixture was found to have a Brookfield viscosity of 100 CPS at 25° C using a No. 3 spindle and 10 rpm.

EXAMPLE 19

4.0 grams of the novel interpolymer of Example 1 were mixed with 48.0 grams of distilled water, 3.4 grams of 15 percent (w/w) sodium hydroxide. 50.0 grams of double strength synthetic sea water comprising 26.4 grams magnesium chloride $.6H_2O$, 3.84 grams calcium chloride $.2H_2O$, 9.6 grams sodium sulfate, 60 grams sodium chloride mixed to a total of 1,200 mls. with distilled water were then added. The mixture was rotated on the wheel of Example 4 for 48 hours and found to have a Brookfield viscosity of 63,600 CPS using a No. 7 spindle and 10 rpm.

For purposes of comparison the above mixture was again prepared employing the unmodified PVM/MA copolymer of Example 1 in lieu of the novel interpolymer of the instant invention. As a result of this formulation, the polymer was found to separate out of solution.

EXAMPLE 20

1.0 grams of the novel interpolymer of Example 3 were mixed with 24.0 grams of distilled water and 25.0 grams of 30 percent ammonia solution. The mixture was then treated as in Example 4 and found to have a Brookfield viscosity of 220 CPS at 25° C using a No. 4 spindle and 10 rpm.

As will readily be apparent from a review of the foregoing examples, the novel interpolymers of the instant invention are particularly adapted for use as thickening agents in aqueous systems and, in particular, in aqueous systems having a high ionic strength.

Various modifications and variations of this invention will be obvious to a worker skilled in the art and it is understood that such modifications and variations are to be included within the purview of this application and the spirit and scope of the appended claims.

What is claimed is:

1. Interpolymers characterized by being uncrosslinked, water-soluble and consisting essentially of the structural units in anhydride form:

UNIT I

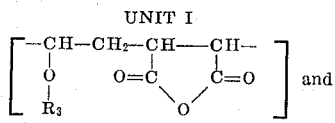 and

UNIT II

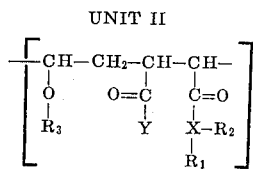

wherein

X represents $-\underset{|}{N}-$, $-O-$;

Y represents $-OH$, $-OR_1$, $-X\underset{R_2}{\overset{R_1}{\diagup}}$ and when Y and $R_2$ are taken together represent a single bond of an imide ring; $R_1$ and $R_2$ represent hydrogen or the same or different hydrocarbon radicals having from 1–50 carbon atoms and together contain a total of from 6 to 50 carbon atoms selected from the group consisting of normal chain alkyl, branched chain alkyl, cycloalkyl, and alkylaryl radicals (and where X= -O-, $R_2$ does not exist); $R_3$ represents the same or different hydrocarbon radicals selected from the group consisting of methyl, ethyl, propyl, isopropyl, butyl, isobutyl, and $-(CH_2CH_2O)_q(CH_2)_mCH_3$ radicals wherein $q$ represents an integer of from about 1 to about 3 and $m$ represents an integer of from about 1 to about 3 wherein Unit I is present in an amount of from about 75 to 99.5 mole % and Unit II is present in an amount of from about 25 to 0.5 mole %.

2. The interpolymer of claim 1 wherein $R_1$ is an alkyl radical having from six to 20 carbon atoms.

3. The interpolymer of claim 1 wherein X represents oxygen.

4. The interpolymer of claim 1 wherein X represents nitrogen.

5. The interpolymer of claim 1 wherein $R_3$ represents a methyl radical.

* * * * *